United States Patent [19]
Distler et al.

[11] 3,741,998
[45] June 26, 1973

[54] PRODUCTION OF AMMONIUM BETAINES
[75] Inventors: Harry Distler, Ludwigshafen; Rudi Widder, Eppelheim, both of Germany
[73] Assignee: Badische Anilin- & Soda-Fabrik Aktiengesellschaft, Ludwigshafen/Rhine, Germany
[22] Filed: Dec. 8, 1970
[21] Appl. No.: 96,270

[30] Foreign Application Priority Data
Dec. 18, 1969 Germany.................. P 19 63 399.9

[52] U.S. Cl........... 260/401, 260/247.1, 260/268 R, 260/293.85, 260/294.8 F, 260/501.12, 252/526, 252/DIG. 7
[51] Int. Cl.......................................... C07c 143/86
[58] Field of Search...................... 260/401, 501.12, 260/294.8 F, 247.1, 293.73, 293.85, 309, 239

E, 268 R

Primary Examiner—Alex Mazel
Assistant Examiner—Jose Tovar
Attorney—Johnston, Root, O'Keeffe, Keil, Thompson & Shurtleff

[57] ABSTRACT

The production of ammonium betaines by reaction of adducts of an oxide of sulfur and an amine with an aziridine, and the new ammonium betaines themselves. The new compounds obtainable according to the process of the invention are surfactants, particularly detergents and assistants in the textile field, softeners, washing aftertreatment agents, germicides, and valuable starting materials for the production of detergents, cleaning agents, detergents, wetting agents, textile assistants, dishwashing agents, shampoos, emulsifiers, dispersing agents, flotation aids, softeners, disinfectants and thickeners.

6 Claims, No Drawings

PRODUCTION OF AMMONIUM BETAINES

The invention relates to a process for the production of ammonium betaines by reaction of adducts of an oxide of sulfur and an amine with an aziridine, and to substances of this type.

It is an object of the invention to provide a new process for producing a large number of ammonium sulfamatobetaines and ammonium thionamatobetaines in good yields and high purity.

Another object of the invention is the new ammonium betaines.

We have found that ammonium betaines having the general formula:

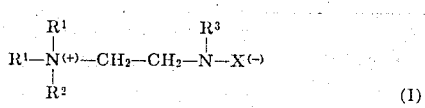

where the individual radicals $R^1$ and $R^2$ may be identical or different and each denotes an aliphatic, cycloaliphatic, araliphatic or aromatic radical, $R^1$ may also each denote a hydrogen atom, both radicals $R^1$ and $R^2$ together or one of the radicals $R^1$ and $R^2$ together with the adjacent nitrogen atom may also be members of a heterocyclic ring, $R^3$ denotes a hydrogen atom or an aliphatic radical and X denotes the radical $-SO_2$ or $-SO_3$ are obtained advantageously by reacting an adduct of an oxide of sulfur and an amine having the general formula:

in which $R^1$, $R^2$ and X have the meanings given above with an aziridine having the general formula:

in which $R^3$ has the meanings given above.

When methylthionamic acid or methylsulfamic acid and ethylenimine are used, the reaction may be represented by the following formulae:

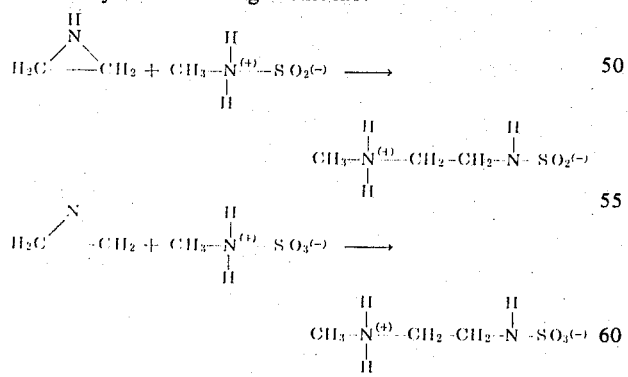

The process according to the invention gives a large number of ammonium sulfamatobetaines and ammonium thionomatobetaines in a simple way in good yields and high purity.

The adducts used as starting material II are generally prepared by reaction of appropriate amines with sulfur dioxide or sulfur trioxide, for example according to the method described in German published ... ... Patent Application P 19 36 789.6) and in HoubenWeyl, "Methoden der organischen Chemie", volume VI/2, pages 455 to 457 and volume 9, pages 503 et seq. Substances, for example appropriate thionyl diammonium sulfites prepared by reaction of tertiary amines with sulfur dioxide, which form starting materials II under the reaction conditions may be used instead of starting materials II.

Preferred starting materials II and consequently preferred end products I are those in whose formulae the individual radicals $R^1$ and $R^2$ are identical or different and each denotes alkyl having from 1 to 25, preferably from 2 to 18, carbon atoms, alkenyl or alkynyl having in each case from 2 to 25, preferably from 2 to 18, carbon atoms (the carbon chain of the alkyl, alkenyl and/or alkynyl radical being interrupted if desired by the groups $-CO-NH-$ and/or

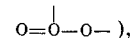

cycloalkyl having 5 to 12 carbon atoms, aralkyl having 7 to 12 carbon atoms, phenyl or naphthyl, one radical $R^1$ may also denote hydrogen and both radicals $R^1$ and $R^2$ together or one radical $R^1$ and $R^2$ together with the adjacent nitrogen atom may also denote members of a five-membered or six-membered heterocyclic ring which may contain (in addition to the nitrogen atom) another nitrogen atom or an oxygen atom, and X denotes the radical $-SO_2$ or $-SO_3$. The said radicals and rings may also bear, as substituents, groups and/or atoms which are inert under the reaction conditions, for example hydroxyl, cyano, sulfonic acid, carboxamido or nitro; fluorine, chlorine or bromine; or carbalkoxy, alkyl, acyloxy, acylamido or alkoxy, in each case having up to four carbon atoms.

When starting from a mixture of amines, for example the mixture of dimethyl palm oil amines (substantially consisting of a nitrogen atom bearing, as substituents, two methyl groups and a lauryl group) obtained by reaction of dimethylamine with lauryl chloride, corresponding mixtures of adducts II and accordingly mixtures of end products I are obtained. In the case of tertiary polyamines, for example N,N'-dimethylpiperazine, the corresponding polyadducts and corresponding polybetaines I are obtained.

The sulfur dioxide or sulfur trioxide adducts of the following bases may be used as starting materials: trimethylamine, triethylamine, tributylamine, triethanolamine, N,N-dimethyl-N-hexylamine, N,N-dimethyl-N-octylamine, N,N-dimethyl-N-decylamine, N,N-dimethyl-N-tridecylamine, N,N-dimethyl-N-octadecylamine, N-methyl-N,N-dioctadecylamine, tridodecylamine, tribenzylamine, N-methyl-N-ethyl-N-phenylamine, N,N-diethyl-N-phenylamine, N-methyl-N-benzyl-N-octylamine, N-methyl-N-benzyl-N-tridecylamine, N-methyl-N-phenyl-N-decylamine, N-methyl-N-phenyl-N-octadecylamine, tri-($\beta$-lauroylamidoethyl)-amine, N-stearyl-N,N-di-($\gamma$-stearatopropyl)-amine, N,N-dimethyl-N-($\gamma$-lauroylamidopropyl)-amine, N,N-dimethyl-N-($\beta$-lauratoethyl)-amine, N,N-dimethyl-N-($\beta$-oleatoethyl)-amine, N,N-dimethyl-N-($\gamma$-stearoylamidopropyl)-amine; similarly substituted primary and secondary amines; pyridine, N-ethylimidazole, N-methylethylenimine, N-methylmorpholine, N-methylpiperidine, N-octylpiperidine, N- decylpiperidine, N-tridecylpiperidine, N-octadecylpiperidine, and N,N-dimethyl-(γ-perfluorocaprylamido)-propylamine.

Other starting materials include aziridines III which are reacted in stiochiometric amounts or in excess, preferably in a molar ratio of 1 to 1.5 moles per mole of adduct II. Preferred starting materials III and consequently preferred end products I are those in whose formulae $R^3$ denotes hydrogen or alkyl having one to four carbon atoms. Examples are ethylenimine, N-methylimine, N-isopropylimine and N-tert-butylethylenimine.

The reaction is carried out as a rule at a temperature of from 0° to +150°C, preferably from 20° to 100°C, at atmospheric or superatmospheric pressure, continuously or batchwise. It is convenient to use organic solvents which are inert under the reaction conditions, for example ethylene chloride, chloroform, trichloroethylene; aromatic hydrocarbons, for example benzene; ethers, for example dioxane, tetrahydrofuran or diethyl ether; aliphatic hydrocarbons, for example heptane, octane, petroleum ether or ligrion; preferably ketones, for example methyl ethyl ketone and particularly acetone; or appropriate mixtures.

The reaction may for example be carried out as follows: Starting material III is slowly fed into starting material II, which may contain a solvent, while mixing well. The mixture is then kept at the reaction temperatures for from half an hour to five hours. The end product is separated by a conventional method, for example by filtration or by removal of the solvent and recrystallization of the residue from a suitable solvent, for example ethanol, methanol, ethyl acetate, acetone or mixtures of the same.

In a preferred embodiment of the process according to the invention the amine is first placed in a vessel at a low temperature within the said range of reaction temperatures and the sulfur oxide is slowly added with good mixing. Starting material III is then added to the adduct thus formed at the same temperature or at a higher temperature and the reaction is carried out in the way described above. Similarly the amine, sulfur oxide, aziridine III and, if desired, a solvent may be mixed with each other and reacted under the reaction conditions. The end product I may thus be prepared economically in a one-stage process using readily accessible starting materials.

Compounds which can be prepared by the process according to the invention are surfactants, particularly detergents and assistants in the textile industry, softeners, washing aftertreatment agents, germicides and valuable starting materials for the production of detergents, cleaning agents, wetting agents, textile assistants, dishwashing agents, shampoos, emulsifiers, dispersing agents, flotation aids, softeners, disinfectants and thickeners.

For example a good wetting effect on cellulose material is obtained with N-dimethyl-N-dodecyl-N-β-sulfamidoethylammonium betaine in a concentration of only 1 to 10 parts in 100 parts of water. A mixture of N-pentadecyl-β-thionamidoethylammonium betaine and N-hexadecyl-β-thionamidoethylammonium betaine may be used in a moderate lather dishwashing agent having for example the following composition:

5 parts of diethanolamine alkylbenzenesulfonate
5 parts of nonylphenyl.10 ethylene oxide
5 parts of a mixture of N-pentadecyl-β-thionamidoethylammonium betaine and N-hexadecyl-β-thionamidoethylammonium betaine
5 parts of isopropanol
5 parts of tetrapotassium pyrophosphate and
75 parts of water.

The following mixture is suitable for example for textile finishing in organic solvents:
90 parts of 1,1,1-trichloroethane
5 parts of water and
5 parts of N-methyl-bis-(N-stearoylamidopropyl)-N-β-sulfamido-ethylammonium betaine.

The end products may also be used as emulsifiers in the copolymerization of polymerizable monomers, for example vinyl homologs. For example very stable dispersions are obtained when polymerization is carried out as follows: A mixture of 1,500 parts of water, 45 parts of N-dimethyl-N-dodecyl-N-β-sulfitoamidoammonium betaine, 15 parts of an adduct prepared by a conventional method from n-dodecyl alcohol and ethylene oxide in the molar ratio 1 : 25, 45 parts of N-vinyl-N-methylimidazolium methosulfate, 30 parts of 30 percent hydrogen peroxide, 1200 parts of vinylidene chloride and 300 parts of ethyl acrylate is polymerized while stirring at 50° to 60°C in a polymerizer. Polymerization is over after eight hours. An about 50 percent dispersion of a copolymer of vinylidene chloride and ethyl acrylate is obtained which is stable in storage and devoid of coagulate. The K value of the copolymer is 60 measured in 0.5 percent solution in cyclohexanone. The dispersion does not froth at pH 7. The dispersion is suitable as a primer for coating film.

The following Examples illustrate the invention. The parts specified in the following Examples are by weight.

EXAMPLE 1

One hundred parts of ethylene chloride and 50 parts of dioxane are cooled to 0°C in a stirred vessel. Twenty parts of liquid sulfur trioxide is slowly added in about twenty minutes at 0°C while stirring well. A solid (a complex of dioxane and $SO_3$) is deposited in crystalline form. 170 parts of N-methyl-bis-(N-stearoylamidopropyl)-amine dissolved in 250 parts of ethylene chloride is slowly added in 30 minutes at 20° to 25°C to the suspension. Then 12 parts of ethylenimine is added. The mixture is heated to 60° to 70°C and stirred for about 4 hours at this temperature. The solvent is then removed at subatmospheric pressure. Two hundred parts of N-methyl-bis-(N-stearoylamidopropyl)-N-β-sulfamidoethylammonium betaine is obtained as a colorless solid powder. It has a sintering point of 160° to 165°C.

EXAMPLE 2

Three hundred thirty-nine parts of N-methyl-bis-(N-stearoylamidopropyl)-amine is dissolved in 600 parts of ethylene chloride at 60°C in a stirred vessel. The whole is cooled to 20°C to 25°C and a solution of 40 parts of sulfur trioxide in 80 parts of ethylene chloride is added slowly within about 30 minutes. The mixture is stirred for 1 hour and 22 parts of ethylenimine is slowly added at this temperature. The whole is heated to 60° C and stirred for another 4 hours. The solvent is removed at subatmospheric pressure. Three hundred ninety-five parts of N-methylbis-(N-stearoylamidopropyl)-N-β-sulfamidoethylammonium betaine is obtained as a col-

EXAMPLE 3

A solution of a mixture of 63.5 parts of N-methyl-N-bis-hexadecylamine and N-methyl-N-bis-octadecylamine in 101 parts of ethylene chloride is slowly added in about thirty minutes at from 0° to 20°C to 25 parts of dioxane and 10 parts of sulfur trioxide in 100 parts of ethylene chloride as described in Example 1. 6 parts of ethyleneimine is added at 20° to 25°C. The mixture is heated to 80°C and the mixture is kept at this temperature for 2 hours. The solvent is removed at subatmospheric pressure. Seventy-eight parts of a mixture of N-methyl-N-bis-(hexadecyl)-N-β-sulfamidoethylammonium betaine and N-methyl-N-bis-octadecyl-N-β-sulfamidoethylammonium betaine remains as a yellowish paste which solidifies on cooling. $n_D^{60} = 1.4675$.

EXAMPLE 4 a. A solution of 62 parts of methylamine in 200 parts of acetone is slowly added at −5°C to 0°C while stirring to a solution of 128 parts of sulfur dioxide in 300 parts of acetone. The mixture is stirred for another hour and the precipitated methylthionamic acid (306 parts) is suction filtered and washed with acetone. It has a melting point of 96° to 98°C.

b. 21.5 parts of ethylenimine is slowly added at 30° to 40°C to a solution of 92.5 parts of methylthionamic acid in 150 parts of ethanol. After the whole has been stirred for another two hours, the solvent is distilled off at subatmospheric pressure and 102 parts (89.4 percent of the theory) of N-methyl-N-β-thionamidoethylammonium betaine is obtained as a yellow viscous oil. $n_D^{20} = 1.4949$.

EXAMPLE 5

Thirty-two parts of sulfur dioxide is passed into a solution of 36.5 parts of butylamine in 150 parts of benzene at 20° to 25°C. 21.5 parts of ethylenimine is slowly added at 30° to 40°C to this solution of butylthionamic acid. A brown crystallizing solid is obtained which is suction filtered from the benzene. The residue is taken up in ethanol, allowed to crystallize out and suction filtered. 57 parts (63.3 percent of the theory) of N-butyl-β-thionamidoethylammonium betaine is obtained. Melting point 230°C with decomposition.

EXAMPLE 6

Thirty-two parts of sulfur dioxide is passed into 127 parts of a mixture of pentadecylamine and hexadecylamine at 30°C. The whole is stirred for another 2 hours. 21.5 parts of ethylenimine is then slowly added at 25°C. 173.2 parts (96.0 percent of the theory) of a mixture of N-pentadecyl-β-thionamidoethylammonium betaine and N-hexadecyl-β-thionamidoethylammonium betaine is obtained as a brown paste. $n_D^{50} = 1.4736$.

EXAMPLE 7

Sixteen parts of sulfur dioxide is passed into a solution of 67 parts of stearylamine in 250 parts of benzene at 50°C while stirring. The whole is stirred for another two hours and then 11 parts of ethylenimine is added slowly to this solution. A brown solid is precipitated which is filtered off and recrystallized from alcohol. The yield is 85.2 parts (80.1 percent of the theory) of N-stearyl-N-β-thionamidoethyl-ammonium betaine having a melting point of from 164° to 167°C

EXAMPLE 8 a. A solution of 64 parts of sulfur dioxide in 150 parts of acetone is added to a solution of 267 parts of oleylamine in 400 parts of acetone while stirring at 5°C. The whole is stirred for another hour and the precipitated solid is filtered off and washed with acetone. Three hundred twenty-one parts (94.0 percent of the theory) of oleylthionamic acid is obtained. The melting point is 78° to 80°C.

b. 8.6 parts of ethylenimine is slowly added to a solution of 66 parts of oleylthionamic acid in 100 parts of ethanol. The whole is stirred for another 2 hours and the solvent is distilled off at subatmospheric pressure. Sixty-five parts (87.3 percent of the theory) of N-oleyl-N-β-thionamidoethylammonium betaine is obtained in the form of a viscous yellow paste. $n_D^{20} = 1.4820$.

EXAMPLE 9 a. A solution of 46.5 parts of aniline in 150 parts of acetone is slowly added to a solution of 32 parts of sulfur dioxide in 250 parts of acetone at −5°C and the mixture is stirred for another half an hour. The precipitated solid is suction filtered and dried. 67.2 parts (85.5 percent of the theory) of phenylthionamic acid is obtained in the form of colorless crystals. The melting point is 74° to 77°C.

b. 8.6 parts of ethylenimine is slowly added to a solution of 31.4 parts of phenylthionamic acid in 150 parts of ethanol while stirring at 25°C. The whole is stirred for another hour. The solvent is distilled off at subatmospheric pressure. 37 parts (98.5 percent of the theory) of N-phenyl-N-β-thionamidoethylammonium betaine is obtained as a yellow oil. $n_D^{20} = 1.5307$.

EXAMPLE 10 a. A solution of 90 parts of dimethylamine in 150 parts of acetone is slowly added to a solution of 128 parts of sulfur dioxide in 200 parts of acetone. The mixture is stirred for another hour and the colorless solid formed is suction filtered. 198 parts (90.7 percent of the theory) of dimethylthionamic acid is obtained in the form of colorless very hygroscopic crystals. The melting point is 85° to 88°C.

b. 54.5 parts of dimethylthionamic acid is dissolved hot in 150 parts of ethanol. 21.5 parts of ethylenimine is added to this solution at 40°C. The whole is stirred for another 2 hours. The ethanol is distilled off at subatmospheric pressure. 67 parts (88.2 percent of the theory) of N,N-dimethyl-N-β-thionamidoethylammonium betaine is obtained as yellowish crystals. The melting point is 74° to 75°C.

EXAMPLE 11 a. Seventy-three parts of diethylamine in 150 parts of acetone is slowly added to a solution of 64 parts of sulfur dioxide in 200 parts of acetone at 0° to +5°C while stirring. The whole is stirred for another hour. A brown solid is obtained which is suction filtered and washed with acetone. The yield is 109 parts (79.5 percent of the theory) of diethylthionamic acid (melting point 98° to 99°C).

b. 21.5 parts of ethylenimine is slowly added to a solution of 68.5 parts of diethyl thionamic acid in 200 parts of ethanol. The mixture is stirred for another two hours. The ethanol is distilled off at subatmospheric pressure. Fifty parts (48.0 percent of the theory) of N,-N-diethyl-N-β-thionamidoethylammonium betaine is obtained in the form of colorless very hygroscopic crystals.

EXAMPLE 12 a. A solution of 85 parts of piperidine in 100 parts of acetone is slowly added to a solution of 64 parts of sulfur dioxide in 200 parts of acetone. The deposited colorless crystalls are suction filtered. 145 parts (97.5 percent of the theory) of piperidinethionamic acid, melting point 101°C with decomposition, is obtained.

b. 8.6 parts of ethylenimine is slowly added at 25°C to a solution of 32 parts of piperidinethionamic acid in 200 parts of ethanol. The whole is stirred for another hour and the solvent is then distilled off at subatmospheric pressure. 37.5 parts (92.2 percent of the theory) of N-β-thionamidoethylpiperidinium betaine is obtained in the form of a yellowish oil. $n_D^{20} = 1.4752$.

EXAMPLE 13 a. Sixty-four parts of sulfur dioxide is passed into a solution of 87 parts of morpholine in 150 parts of benzene at 30°C. The whole is stirred for another 2 hours at 25°C and the benzene is distilled off at subatmospheric pressure. The crystalline residue is recrystallized from 150 parts of dioxane. One hundred thirty-seven parts of morpholinethionamic acid is obtained (90.7 percent of the theory).

b. 17.2 parts of ethylenimine is slowly added at 25° to 30°C to a solution of 60.4 parts of morpholinethionamic acid in 100 parts of ethanol. The whole is stirred for another two hours and then the ethanol is distilled off at subatmospheric pressure. Seventy-five parts (96.1 percent of the theory) of N-β-thionamidoethyl-morpholinium betaine is obtained in the form of a colorless viscous oil. $n_D^{20} = 1.4994$.

EXAMPLE 14 a. Thirty parts of trimethylamine is added to 64 parts of liquid sulfur dioxide at −40° to −20°C. The mixture is stirred for another 4 hours at 20° to 25°C. The crystalline solid formed is filtered off. 55 parts (88.7 percent of the theory) of thionyldi-(trimethylammonium) sulfite is obtained. Melting point 55°C.

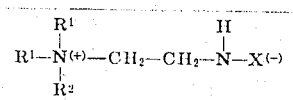

b. 21.5 parts of ethylenimine is added to a solution of 61.5 parts of thionyldi-(trimethyl ammonium) sulfite in 100 parts of acetone at 20° to 25°C. The mixture is stirred for another 2 hours at 50°C and then cooled. The deposited crystals are suction filtered. 74 parts (89.2 percent of the theory) of N-trimethyl-N-β-thionamidoethylammonium betaine is obtained. The melting point is 155°C with decomposition.

EXAMPLE 15

Thirty-two parts of sulfur dioxide is passed into a solution of 50.5 parts of triethylamine in 150 parts of benzene at 20° to 25°C while stirring. After the whole has been further stirred for 2 hours, 21.5 parts of ethylenimine is slowly added at 50°C. The linear solid formed is filtered off and recrystallized from methanol. The yield is 50 parts (48.1 percent of the theory) of N-triethyl-N-β-thionamidoethylammonium betaine. The melting point is 148°C with decomposition.

EXAMPLE 16 a. Two hundred parts of sulfur dioxide is passed into a solution of 426 parts of N-dimethyldodecylamine in 250 parts of acetone at 20°C. The whole is stirred for another three hours at 25°C. The solvent is then distilled off at subatmospheric pressure. Five hundred twenty parts (94.0 percent of the theory) of thionyldi-(dimethyldodecylammonium) sulfite is obtained in the form of a yellow oil. $n_D^{20} = 1.4729$.

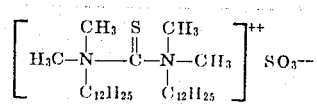

b. 12.9 parts of ethylenimine is slowly added at 25°C to 41 parts of thionyldi-(dimethyldodecylammonium) sulfite while stirring. After further stirring for another three hours at 30° to 35°C, 46 parts (85.1 percent of the theory) of N-dimethyl-N-dodecyl-N-β-sulfitamido-ethylammonium betaine is obtained in the form of a brownish hygroscopic paste. $n_D^{20} = 1.4770$.

We claim:

1. An ammonium betaine having the formula:

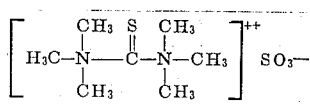

wherein both radicals $R^1$ denote N-stearoylamidopropyl, $R^2$ denotes methyl and X denotes —SO$_3$.

2. An ammonium betaine having the formula:

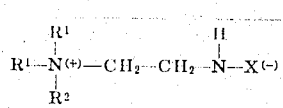

in which $R^1$ and $R^2$ are γ-stearoylamidopropyl, β-lauroyl-amidoethyl, γ-lauroylamidopropyl, γ-perfluorocaprylamidopropyl or methyl, at least one of $R^1$ and $R^2$ being other than methyl, and X denotes —SO$_3$.

3. A process for the production of an ammonium betaine having the formula:

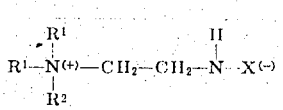

in which $R^1$ and $R^2$ are γ-stearoylamidopropyl, β-lauroyl-amidoethyl, γ-lauroylamidopropyl, γ-perfluorocaprylamidopropyl or methyl, at least one of $R^1$ and $R^2$ being other than methyl, and X denotes —SO$_3$, which comprises reacting ethylenimine with an adduct of sulfur trioxide and an amine having the formula

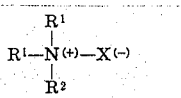

in which $R^1$, $R^2$ and X have the meanings given above at a molar ratio of said ethylenimine to said adduct of 1—1.5:1 at a temperature of 0° to 150°C.

4. A process as claimed in claim 3, said temperature being in the range of 20° to 100°C.

5. A process as claimed in claim 3 wherein the reaction of said ethylenimine and said adduct is carried out in an organic solvent which is inert under the reaction conditions.

6. A process as claimed in claim 3 wherein both radicals $R^1$ denote γ-stearoylamidopropyl and $R^2$ denotes methyl.

* * * * *